United States Patent [19]
Jenkins

[11] 3,942,189
[45] Mar. 2, 1976

[54] MAGNETIC TAPE REPRODUCING APPARATUS WITH SOLENOID ACTUATED TAPE LIFTER MEANS AND AUTOMATIC CONTROL THEREFOR

[75] Inventor: John P. Jenkins, Towanda, Ill.
[73] Assignee: International Tapetronics Corporation, Bloomington, Ill.
[22] Filed: July 18, 1974
[21] Appl. No.: 489,614

[52] U.S. Cl. .................... 360/13; 360/90; 360/130
[51] Int. Cl.² ......................................... G11B 27/02
[58] Field of Search .................. 360/13, 71, 90–96, 360/130

[56] References Cited
UNITED STATES PATENTS
3,042,753  7/1962  Iwamura ............................ 360/130

*Primary Examiner*—James W. Moffitt
*Attorney, Agent, or Firm*—McCaleb, Lucas & Brugman

[57] ABSTRACT

In a magnetic tape reproducer, tape lifer bars are rectilinearly movable in one direction by activation of a solenoid to engage the tape and lift it from the heads. The bars are movable in the opposite direction by a biasing spring, when the solenoid is deenergized, so the tape can contact the heads. A cover gate is mechanically connected to the bars and acts as a handle to cause the bars to move the tape back and forth toward the heads.

A control circuit includes a normally closed play switch and a resistor connected in series with the solenoid. A bypass conductor parallels the resistor and has normally open fast forward and rewind switches in parallel with one another and in series with a normally closed edit switch. The play switch automatically opens and deenergizes the solenoid, the biasing spring moves the bars out of engagement with the tape which runs forward at play speed while the signal on the tape is reproduced through audio output means. The fast forward or rewind switch automatically closes which fully energizes the solenoid through the bypass conductor and causes it to override the bias of the spring and move the bars to lift the tape off the heads while the tape runs at fast speed with the audio deactivated and the tape can be scanned at fast speed by concurrently opening the edit switch and activating the audio output means. This partially activates the solenoid through the resistor sufficiently to offset but not override the pull of the spring and enables the operator to adjust the listening volume of the audio output signal by manually moving the cover gate to adjust the proximity of the tape relative to the reproduce head.

11 Claims, 18 Drawing Figures

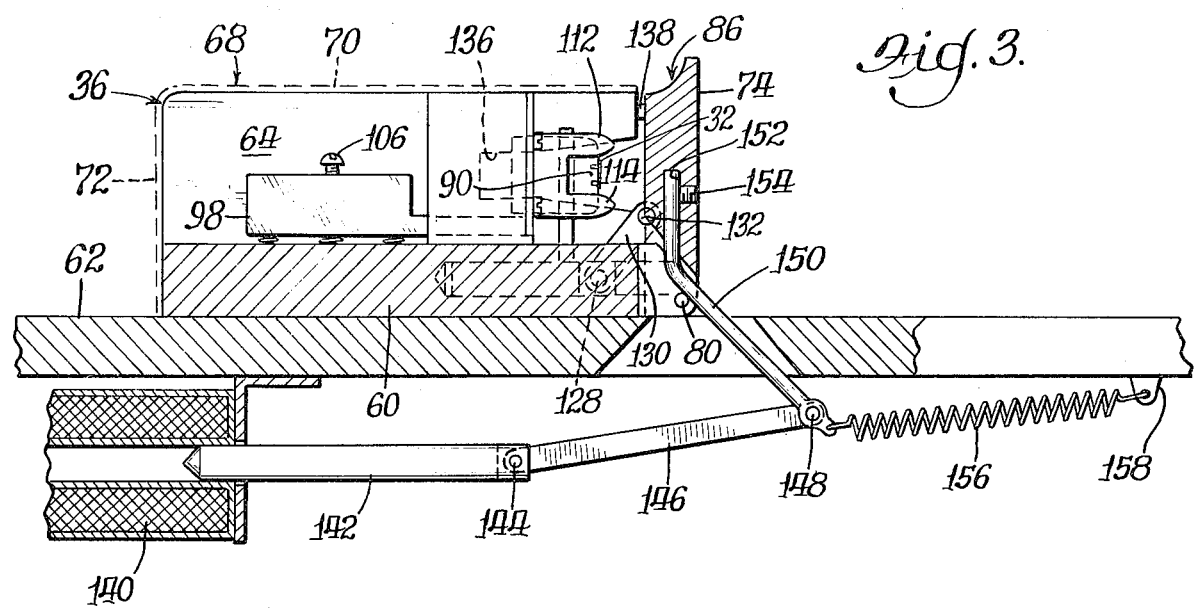
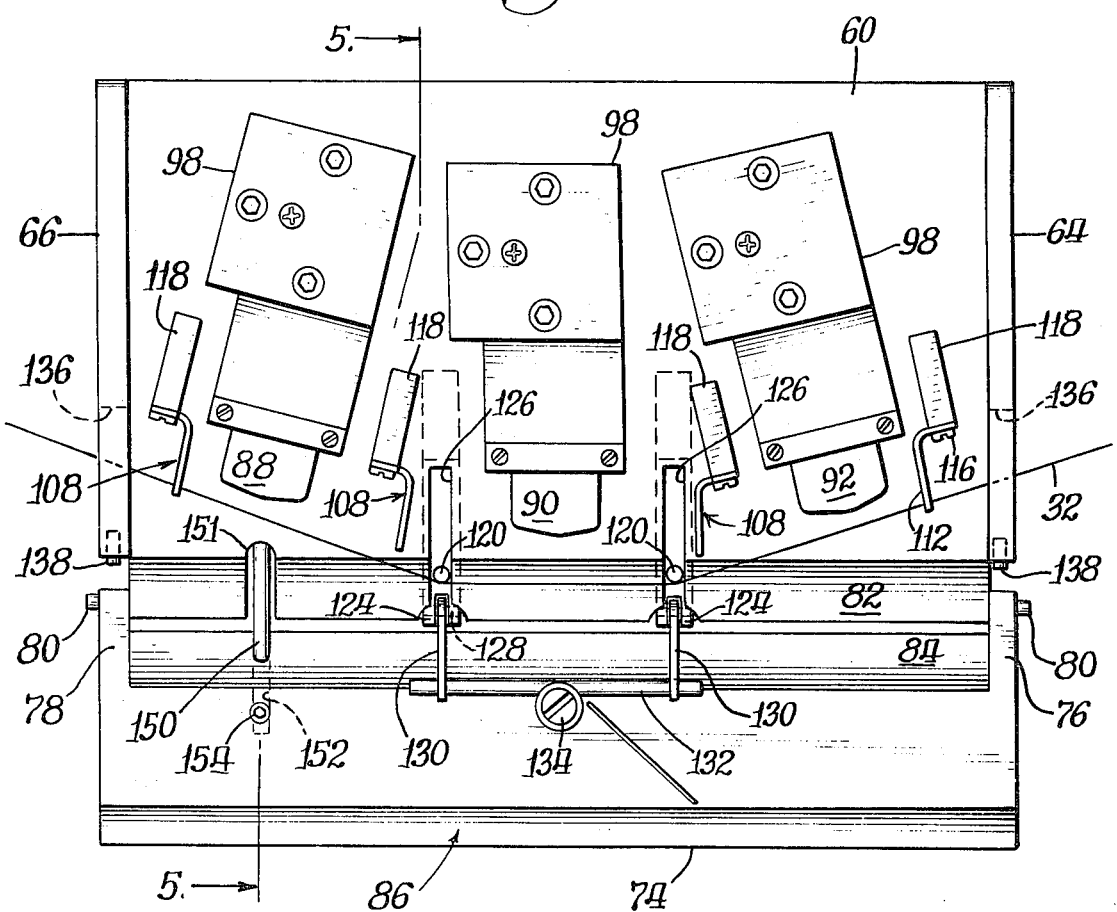

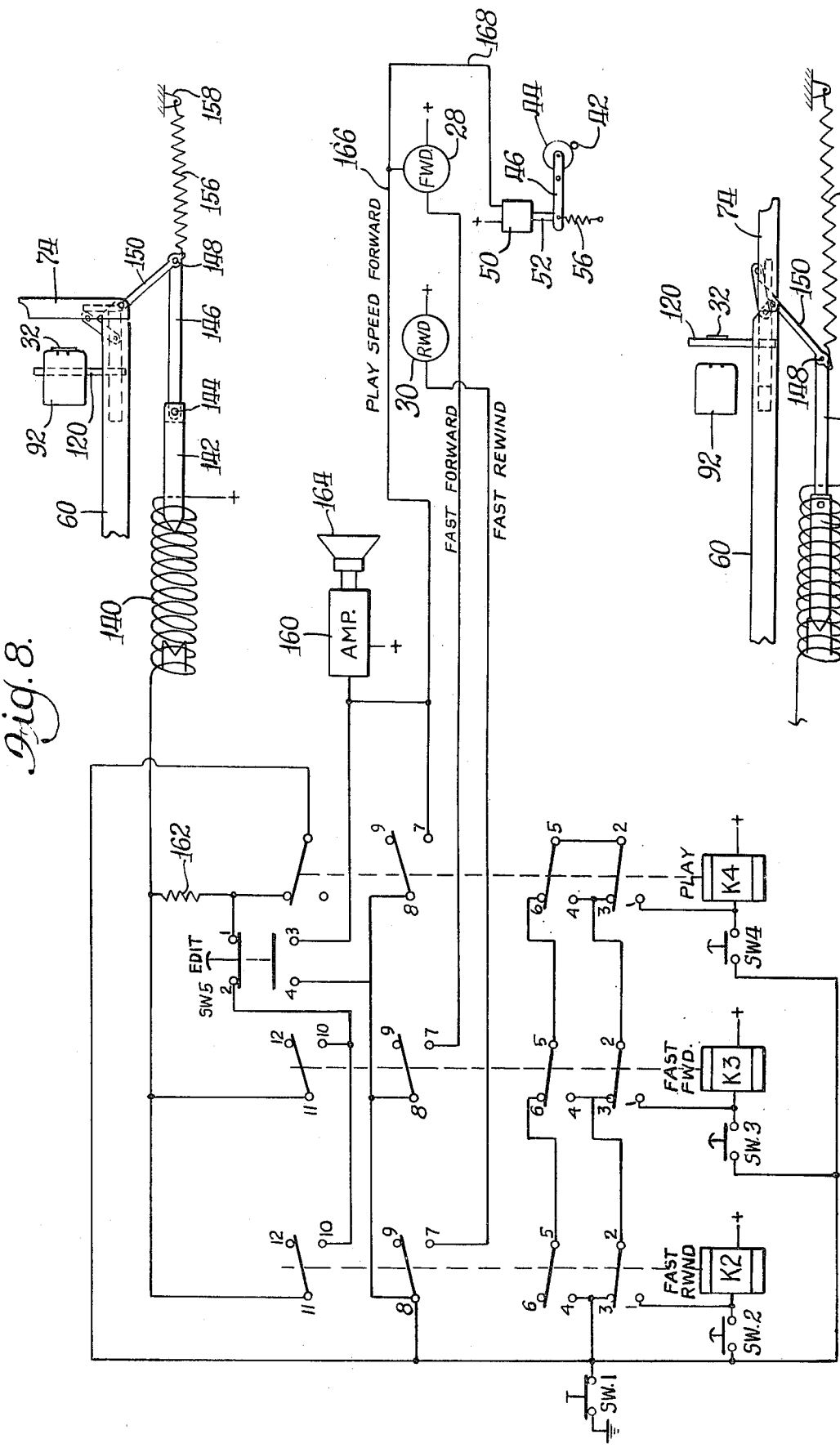

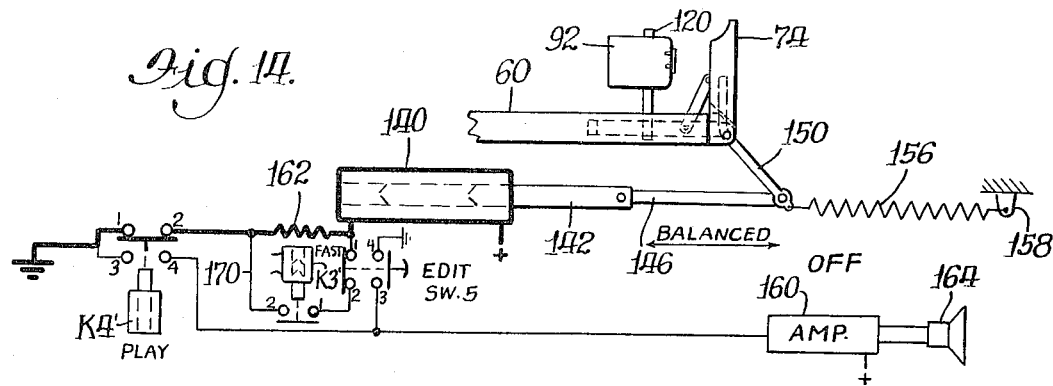
Fig. 14.
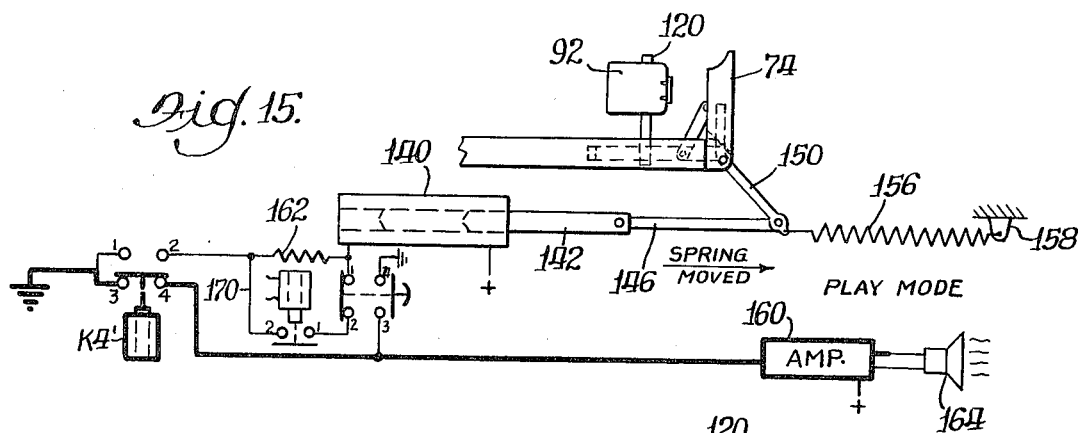
Fig. 15.
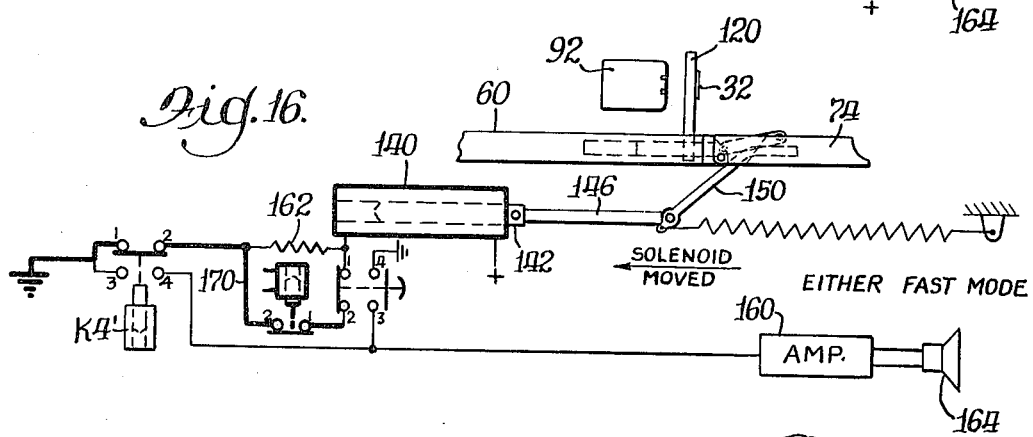
Fig. 16.
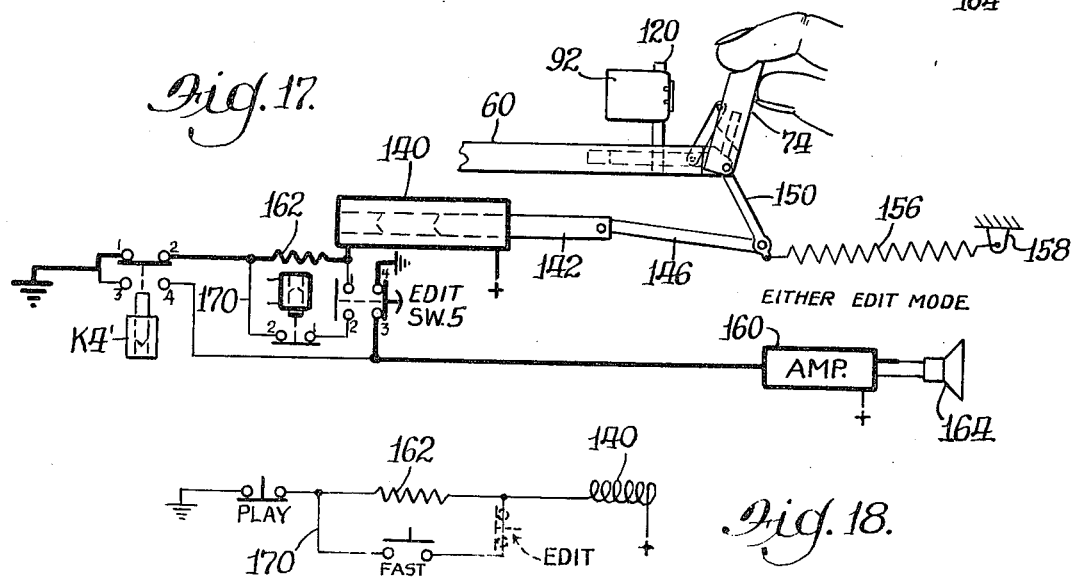
Fig. 17.
Fig. 18.

MAGNETIC TAPE REPRODUCING APPARATUS WITH SOLENOID ACTUATED TAPE LIFTER MEANS AND AUTOMATIC CONTROL THEREFOR

CROSS REFERENCES TO RELATED APPLICATIONS

Reference is made to the following copending, related patent applications, assigned to the same assignee:

Jenkins Application Ser. No. 344,180, filed Mar. 23, 1973 now U.S. Pat. No. 3,869,719 on AUTOMATIC SEQUENCE CONTROL FOR REPRODUCING APPARATUS; and Jenkins U.S. Pat. No. 3,800,323, issued Mar. 26, 1974 on CASSETTE TAPE TRANSPORT WITH PIVOTALLY SUPPORTED UNIVERSALLY ADJUSTABLE HEAD AND UPRIGHT FRONT-MOUNTED CASSETTE.

BACKGROUND OF THE INVENTION

This invention relates to tape recording and playback apparatus in which a magnetic tape is wound at opposite ends on a pair of motor driven reels for forward and rewind movement past recording and reproducing heads.

In commercial radio broadcasting, it is well established practice to pre-record a wide variety of programs, from short time announcements and commercials to entire hour long entertainment and educational packages. Some radio stations are 100 per cent automated, using pre-recorded material exclusively.

In preparing pre-recorded material for later transmission, or for editing raw transcriptions for broadcast, it is often necessary to locate certain recorded material, or to cut certain versions out to meet a time requirement. For this purpose it is desirable to scan or monitor the tape by listening to it at fast speed before listening to it at play speed.

Furthermore, to minimize head wear it is desirable to completely disengage the tape from the heads when the tape runs at fast speed in either forward or rewind directions without scanning or monitoring the tape.

In conventional tape handling equipment for broadcast purposes, many of these monitoring, playback, and scanning procedures have to be carried out manually with considerable time consumption and pressure on the operator or engineer, especially when the schedule calls for a series of short, tightly-cued cuts of news or special interest items which have to be prepared in a hurry.

BRIEF SUMMARY OF THE INVENTION

A general object of this invention is to provide magnetic tape reproducing apparatus which automatically disengages the tape from the heads when the apparatus is placed in fast forward or fast rewind mode.

Another object is to provide magnetic tape reproducing apparatus which can be placed in edit mode to scan the content of the tape at fast speed while listening to an audio output reproduction of the signal on the tape, and while manually adjusting the spacing of the tape relative to the reproducing head to adjust the output volume.

An important feature of the invention is that a tape lifter in the head assembly is movable in one direction by a solenoid against a biasing spring, and control means is provided to automatically energize the solenoid fully, partially, or not at all. The housing compartment for the head assembly has a manually operable cover gate mechanically connected to the tape lifter. The cover gate automatically closes and the solenoid automatically deenergizes during the play mode. The cover gate automatically opens and the solenoid automatically fully energizes during the fast forward or fast rewind mode any time the edit mode is not being utilized. When placed in the edit mode during one of the fast forward or fast rewind modes, or during each, the solenoid is automatically partially energized and offsets and balances without overcoming the bias of the spring, so that the proximity of the tape to the reproducing head, and therefore the amplitude of the audio output means, is adjustable by manually moving the cover gate through a range of stable adjusted positions.

BRIEF DESCRIPTION OF THE DRAWINGS

Other objects and advantages will be apparent from the following description taken in connection with the drawings in which:

FIG. 3 is a vertical cross-sectional view of FIG. 2 taken along the line 3—3;

FIG. 4 is a view similar to FIG. 2 showing the cover gate wide open and with the tape lifter bars fully lifted disengaging the tape from the heads;

FIG. 8 is a circuit diagram illustrating one form of control circuit for the embodiment shown in FIGS. 1-7, the circuit being shown in off condition with the spring biasing means overriding the solenoid which is deenergized at this time;

FIG. 9 is a fragmentary view of FIG. 8 showing the solenoid when it is fully energized through a bypass conductor causing the tape lifters to lift the tape out of contact with the heads, overriding the spring biasing means;

FIG. 14 is a view similar to FIG. 11 with the control circuit being diagrammatically shown but adding provision for an edit condition, the circuit being shown in off mode;

FIG. 15 is the circuit of FIG. 14 in play mode;

FIG. 16 is the circuit of FIG. 14 in either of the fast forward or fast rewind modes;

FIG. 17 is the circuit of FIG. 14 in either of the fast forward or fast rewind edit modes; and FIG. 18 is a fragmentary view illustrating a basic combination of control elements in the invention common to the embodiments illustrated.

DETAILED DESCRIPTION OF THE PREFERRED EMBODIMENTS

Figure 1:
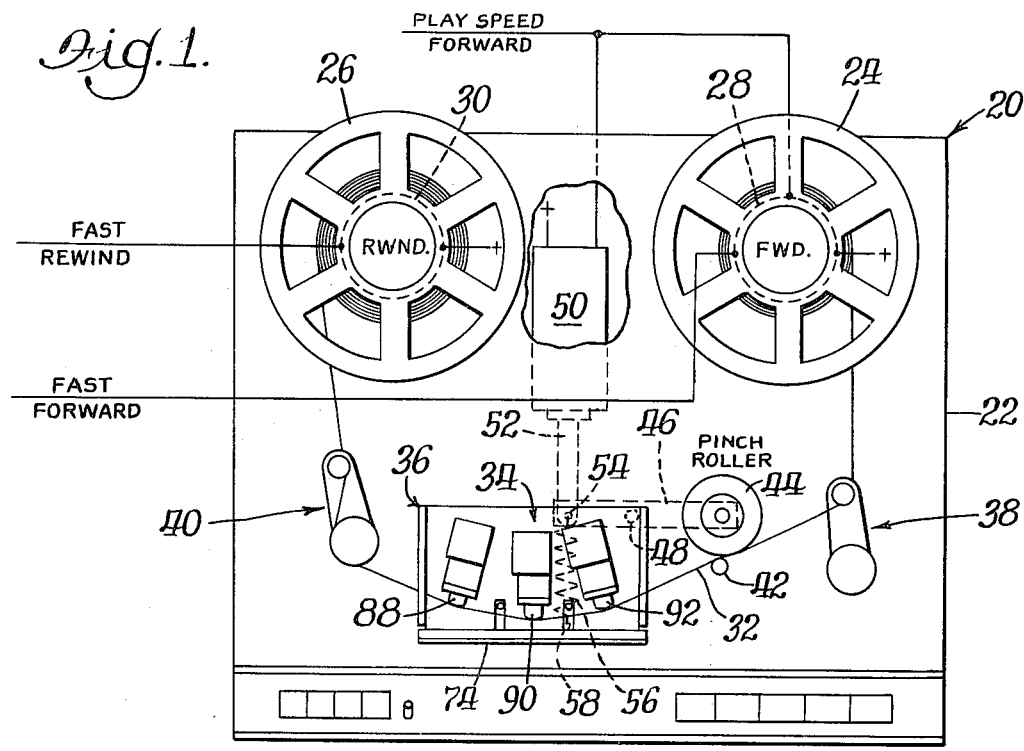
FIG. 1 is a plan view of a magnetic tape recording and reproducing apparatus illustrating one form of the present invention.

Preferred embodiments of the invention shown in the drawings will now be described.

Referring first to the embodiment in FIGS. 1–10, recording and reproducing apparatus 20 comprises a known form of housing 22 with forward and rewind reels 24 and 26 rotatably driven by forward and rewind motors 28 and 30. A magnetic recording tape 32 is trained for forward and rewind movement past transducer head means 34 located in a head compartment 36. The tape is pulled taut by tensioning assemblies 38, 40 and is held at constant linear speed in play mode in the usual manner by frictional engagement between constant speed capstan 42 and pinch roller 44 while driven by forward motor 28. The pinch roller is mounted on the end of a lever 46 pivoted at 48 to the housing 22. A play solenoid 50 has an armature-actuated plunger 52 pivoted at 54 to the other end of lever 46. A return spring 56 is tensioned between the movable pivot pin 54 and a fixed post 58 on the housing. When the solenoid 50 is energized it pulls the lever 46 and presses the pinch roller 44 to the play position shown in FIG. 1. When the solenoid 50 is deenergized, the return spring 56 pulls the lever 46 in direction to disengage the pinch roller from the capstan, this being the position assumed in either fast forward or fast rewind modes, and in either edit mode.

As best shown in the enlarged views of FIGS. 2–7, the transducer head compartment 36 completely encloses and shields the head means 34. The head compartment comprises a bottom plate 60 suitably mounted on base plate 62 of housing 22. There are two upstanding side plates 64, 66 and a cover plate 68 shown only in broken lines in FIG. 3. The cover plate shown may be formed by bending a metal sheet at right angles and includes top and back wall portions. These portions comprising the head compartment 36 may be assembled in any suitable way, as by welding or by screws or by a combination thereof.

A cover or closure gate 74 is provided for the front of the head compartment. It has a pair of lower arm extensions 76, 78 pivoted on pins 80 extending from opposite edges of the bottom plate 60. Note that the forward portion of the bottom plate 60 extends somewhat forwardly from the front edges of the side plates 64, 66 to accommodate the thickness of the cover gate. As best shown in FIGS. 3–7, the front edge of bottom plate 60 and the bottom edge of the cover gate are provided with matching diagonal edge surfaces 82 and 84, respectively. The top edge of the cover gate is narrowed by means of an incurvation 86 to provide a relatively thin portion above the level of the top wall portion 70 to facilitate manual grasping and manipulation as will be described.

The transducer head means 34 in the head compartment 36 includes an erase head 88, a record head 90, and a reproduce head 92. The present invention is primarily concerned with the latter. Each is supported by a cross bar 94 and screws 96 to a mounting block 98 which is adjustably mounted to the bottom plate 60 by height and zenith adjustment screws 100 and 102, an azimuth adjustment screw 104 and a lock screw 106. This arrangement for mounting and adjusting the heads is described in applicant's U.S. Pat. No. 3,800,323 issued Mar. 26, 1974 to which reference may be had for details. Tape guides 108 are provided on both sides of each head. Each includes a forward, vertically C-shaped, horizontally curved strip with upper and lower limbs 112, 114 retaining the tape in vertically centered position on the heads. Each strip is held by screws 116 to a mounting block 118 suitably fastened to the bottom plate 60.

An important part of the invention is a pair of tape lifter bars 120, 120 which are rectilinearly movable to lift the tape away from the heads and lower it onto the heads. These tape lifter bars are mechanically connected to the closure gate 74 and are movable through a range of adjusted positions, all parallel to the tape in response to manual manipulation of the gate as will be described. They are also movable in response to electrical energization and deenergization of a solenoid which will also be described.

Referring to FIGS. 2–7, each tape lifter bar extends upright from a corresponding one of two parallel rods 124 fitted for longitudinal movement within a pair of parallel horizontal bores in the front portion of the bottom plate 60. The upper floor surface of bottom plate 60 has a pair of upwardly open slots 126 for the bars 120 to run in. Each rod 124 has a clevis portion at its front end pivoted as by a pin 128 to a link 130. Both links are pivoted at their upper or outer ends to a horizontal draw bar 132 retained in a conforming horizontal recess in the cover gate 74 by a centrally located screw 134. With this arrangement the cover gate can be moved to the fully open position shown in FIGS. 4 and 5 to thereby move the tape lifter bars 120 in one direction, outward, to lift the tape out of engagement with the heads for fast traverse in fast forward or fast rewind modes. By moving the cover gate to the vertical position shown in FIGS. 2 and 3, the tape lifter bars are moved in the opposite direction, inward, disengaged from the tape, and enabling it to be in full operative engagement with the heads as for example during recording or play mode.

Figure 2:
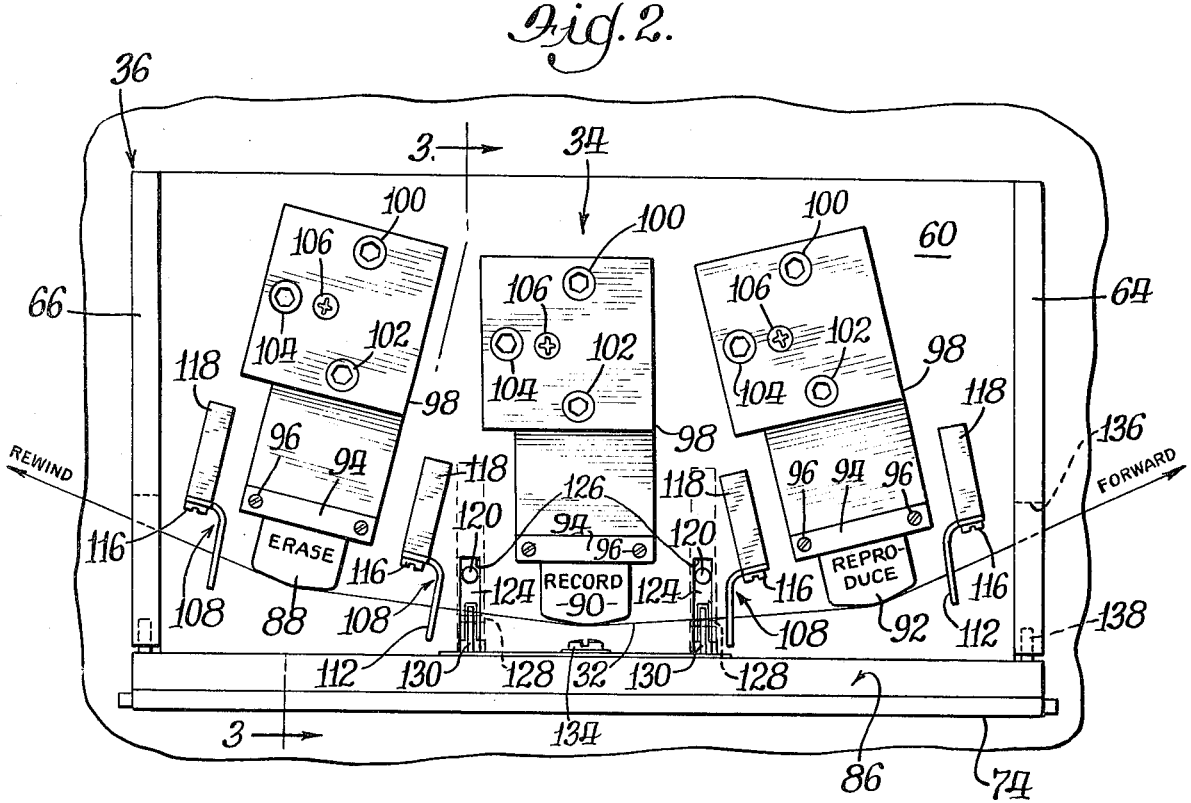
FIG. 2 is an enlarged fragmentary view of FIG. 1 showing the transducer head housing compartment.

As best shown in FIGS. 2 and 3, forwardly open slots 136 are provided in the side plates 66 and 64 to clear the tape. Rubber bumper pads 138 are fitted within bores in the side plates to engage the gate 74 and prevent noise when it closes.

A gate actuating solenoid 140 is mounted on the underside of the housing base plate 62. Its armature or plunger 142 is pivotally connected at 144 to a link 146. This, in turn, is pivotally connected at 148 to a lever 150 having an upper angularly offset end portion retained in a bore 152 in the gate 74 by a set screw 154. A notch 151 at the front edge of plate 60 provides clearance for the lever 150. A biasing spring 156 is tensioned between the end of lever 150 and a bracket 158 on the underside of the housing base plate 62.

Figure 5:
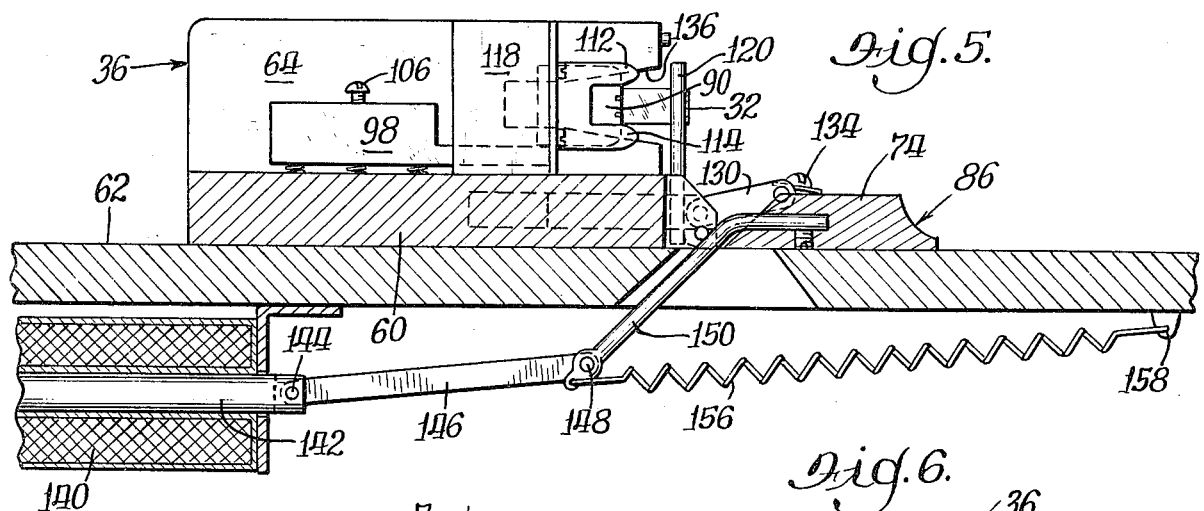
FIG. 5 is a vertical cross-sectional view of FIG. 4 taken along the line 5—5.
Figure 7:
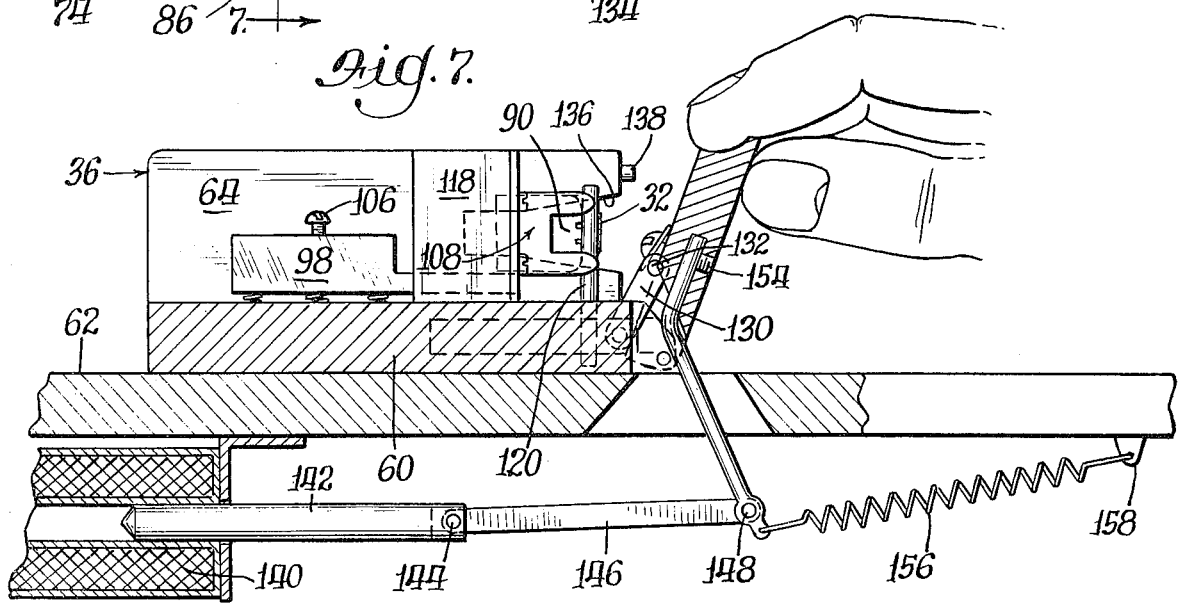
FIG. 7 is a vertical cross section of FIG. 6 taken along the line 7—7 further illustrating the edit position in which the audio output volume is adjustable by manually moving the cover gate.

When the solenoid 140 is fully energized, it overrides spring 156 and fully opens the cover gate 74 to the position shown in FIGS. 4 and 5. When the solenoid 140 is deenergized, the spring 156 pulls the gate to the fully closed position shown in FIGS. 2 and 3. When the solenoid is partially energized through a properly sized resistor as will be described, the solenoid offsets the bias of the spring without overriding it and does not change its position; however, the gate 74 and the lifter bars 120 may be manually moved as shown in FIG. 7 throughout a range of stable positions, all parallel to the tape, to adjust the proximity of the tape to the heads and each such manually-adjusted position will be retained until the solenoid 140 is either fully energized or deenergized.

One control circuit for carrying out the above aims is shown in FIG. 8. There is a fast rewind relay K2, a fast forward relay K3, and a play relay K4. The relays are energized through various control switches to be described by a direct current electrical power source indicated by the ground and positive voltage symbols in FIG. 8. In actual practice, the electrical power source for the components shown in FIG. 8 may be a 24-volt supply. For other components now shown because they are not essential to description of the present invention, such as transistors, solid-state devices and other electronic components, a 5-volt supply may be adequate. For a more complete and detailed description of a control circuit for reproducing apparatus, reference may be had to the applicant's U.S. patent application Ser. No. 344,180 filed Mar. 23, 1973 on AUTOMATIC SEQUENCE CONTROL FOR REPRODUCING APPARATUS.

The control circuitry utilizes ground switching. A ground is supplied through a main switch SW1. Relay K2, relay K3, relay K4, solenoids 50 and 140, audio amplifier 160, and forward and rewind motors 28 and 30 are connected to the positive side of a suitable electrical power source.

OFF MODE

Figure 6:
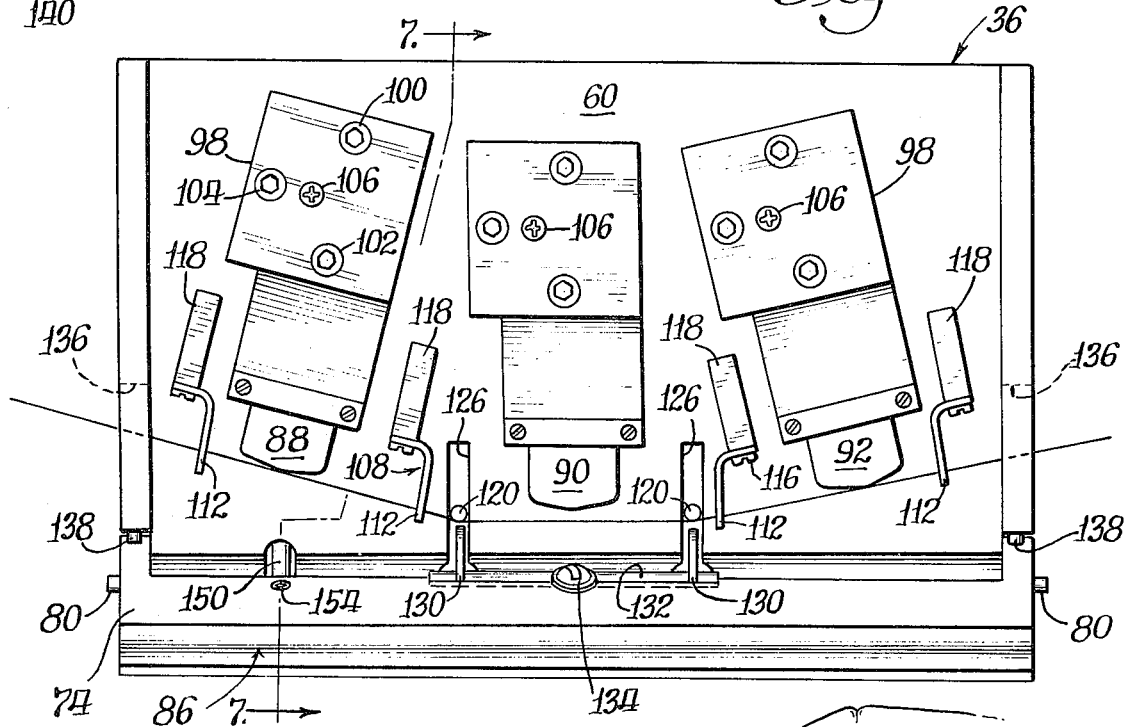
FIG. 6 is a view similar to FIGS. 2 and 4 illustrating the edit position in which the spacing of the tape relative to the reproducing head is adjustable by manually moving the cover gate to thereby adjust the audio output volume.
Figure 10:
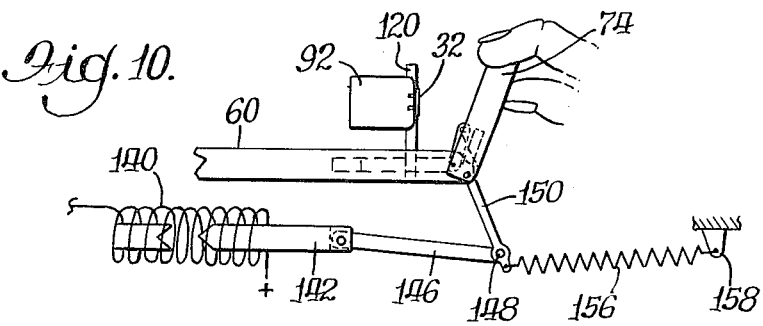
FIG. 10 is a view similar to FIG. 9 showing the solenoid when partially energized through a control resistor in FIG. 8 to offset but not override the biasing spring, and further illustrating the edit mode in which the spacing of the tape relative to the reproduce head is adjustable by manually moving the cover gate.

When the circuit shown in FIG. 8 is energized by the closing of SW1, the gate actuating solenoid 140 is energized at reduced voltage through resistor 162 which is sized to offset but not override the bias of spring 156. Thus, in the off mode, the solenoid 140 balances the spring 156 and whether the gate 74 is closed as shown in FIGS. 2, 3 and 8 or fully open as shown in FIGS. 4, 5 and 9 or at an intermediate position as shown in FIGS. 6, 7 and 10, it stays as is unless it is manually moved as will be described in connection with the off and edit modes.

PLAY MODE

Play mode is initiated by momentarily closing switch SW4. This energizes play relay K4 and locks it energized through a holding circuit including contacts 1, 2 and 4, 5 of K4 and contacts 2, 3 each of K2 and K3. The audio amplifier 160 is energized through contacts 7, 8 of K4 and generates audio output through suitable means here shown as speaker 164. Simultaneously, the forward motor 28 and pinch roller solenoid 50 are energized through contacts 7, 8 of K4 and conductors 166 and 168, respectively.

Thus, in play mode the tape 32 is driven forward at play speed determined by the capstan 42. Audio is on. Solenoid 140 is deactivated enabling spring 156 to close the gate 74 and move the tape lifter bars 120 to a position where the tape contacts the reproducing head 92.

FAST FORWARD MODE

Fast forward mode is initiated by momentarily closing switch SW3. This energizes fast forward relay K3 and locks it energized through a holding circuit including contacts 2, 3 of K2; contacts 4, 5 of K3; contacts 5, 6 and 2, 3 of K4; and contacts 1, 2 of K3. The audio amplifier 160 is not energized. The forward motor 28 is energized through contacts 7, 8 of K3. The solenoid 140 is fully energized through normally closed contacts 1, 2 of edit switch SW5 and contacts 10, 11 of K3; this bypasses the resistor 162, fully and directly energizing the solenoid 140, overcoming the bias of spring 156, opening the gate 74 and moving the tape lifters 120 to lift the tape 32 off the heads.

Thus, in fast forward mode the tape 32 is driven forward at fast speed with no hold back by the constant speed capstan 42. Audio is off. Solenoid 140 is fully energized through a circuit bypassing the resistor 162. Tape is lifted off the heads and runs at fast speed in a forward direction while held away from the heads by the tape lifter bars.

REWIND MODE

This is the same as the fast forward mode just described except that it is initiated by energizing fast rewind relay K2, and the tape runs in a rewind direction. Specifically, fast rewind mode is initiated by closing switch SW2. This energizes fast rewind relay K2 and locks it energized through a holding circuit including contacts 1, 2 and 4, 5 of K2 and 2, 3 and 5, 6 of each of K3 and K4. The audio amplifier 160 is not energized. Rewind motor 30 is energized through contacts 7, 8 of K2. The gate actuating solenoid 140 is fully and directly energized, bypassing the resistor 162, through a bypass circuit including contacts 1, 2 of edit switch SW5 and contacts 10, 11 of K2.

Thus, in rewind mode the tape 32 is driven in rewind direction at fast speed without limitation imposed by the constant speed capstan 42. Audio is off. Solenoid 140 is fully activated, overcoming spring 156 and opening gate 74 and moving the tape lifter bars 120 in a direction to lift the tape 32 from the reproducing head 92. Tape rewinds at fast speed, sliding across the tape lifter bars 140 out of contact with the heads.

EDIT MODE

An important feature of the present invention is that while the apparatus is in either the fast forward or fast rewind mode above described, the tape may be scanned at high speed to monitor it to locate a particular cut, simply by depressing the edit switch SW5.

If the edit switch is depressed while the apparatus is in fast forward mode, the following two changes will occur over that already described for the fast forward mode: (a) contacts 1 and 2 of edit switch SW5 will open thereby removing the bypass circuit through which the solenoid 140 was fully energized, and causing that solenoid to be energized partially through the resistor 162; and (b) contacts 3 and 4 of edit switch SW5 will close, energizing the audio amplifier 160 to generate audio output through the speaker 164.

Similarly, when the apparatus is in rewind mode, it may be converted to edit mode simply by depressing the edit switch SW5. This opens the direct bypass circuit for solenoid 140 which had been established through contacts 10, 11 of K2 and energizes it only partially through the resistor 162 as described in the above paragraph. In addition, contacts 3, 4 of the edit switch close, energizing the audio amplifier 160 to produce audio output through the speaker 164 as described.

In either of the edit modes described, the tape will be driven at fast speed in one direction or the other and the partial energization of the solenoid 140 will be sufficient to offset without overriding the biasing spring 156. This balances the tape lifter bars 120 and the gate 74 between the solenoid 140 and the spring 156 so that the tape lifter bars may be moved in one direction or another throughout a range of stable, parallel positions by manually manipulating the gate 74 as shown in FIGS. 7, 10 and 17. Thus, as the tape is driven at fast speed in forward or rewind direction, depending on the edit mode selected, the contents of the tape can be monitored at fast speed by listening to the audio output and the volume of the audio output can be adjusted to suit the operator by moving the gate 74 back and forth to vary the proximity of the tape relative to the reproducing head 92. Such manual manipulation of the gate 74 during either edit mode is illustrated in FIG. 10 and is illustrated on a larger scale in FIGS. 6 and 7. Note in FIG. 6 that the tape 32 is illustrated as barely touching the reproducing head 92 and this may be varied slightly one way or the other to increase or decrease the audio volume as required.

Figure 11:
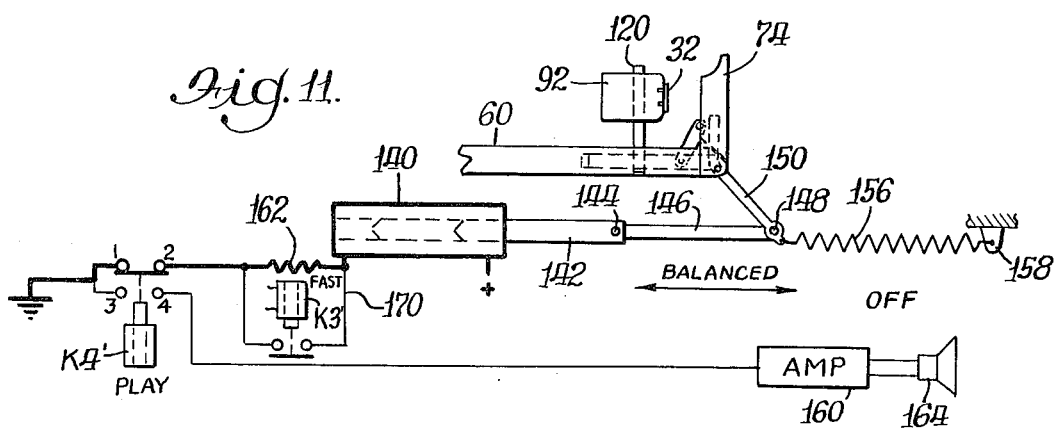
FIG. 11 is a simplified circuit diagrammatically illustrating a basic form of the present invention without provision for an edit mode, the circuit being shown in off mode.
Figure 12:
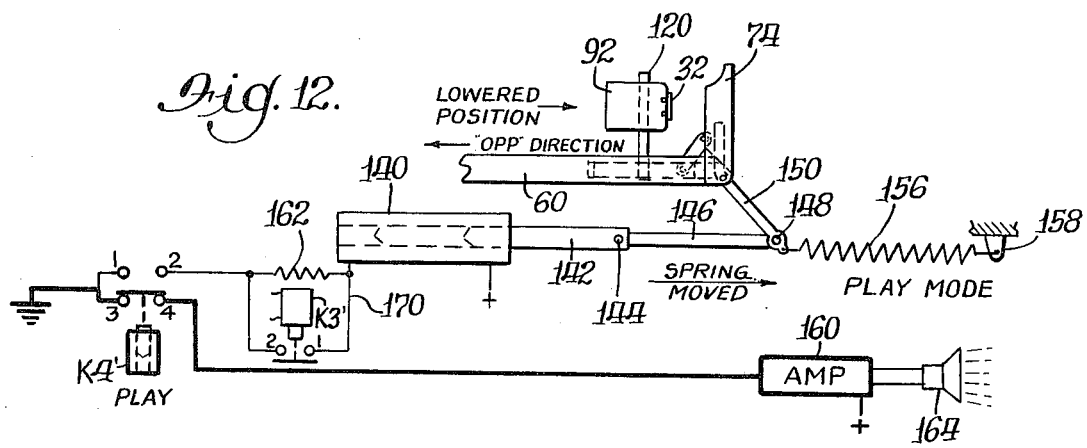
FIG. 12 is the circuit of FIG. 11 in play mode.
Figure 13:
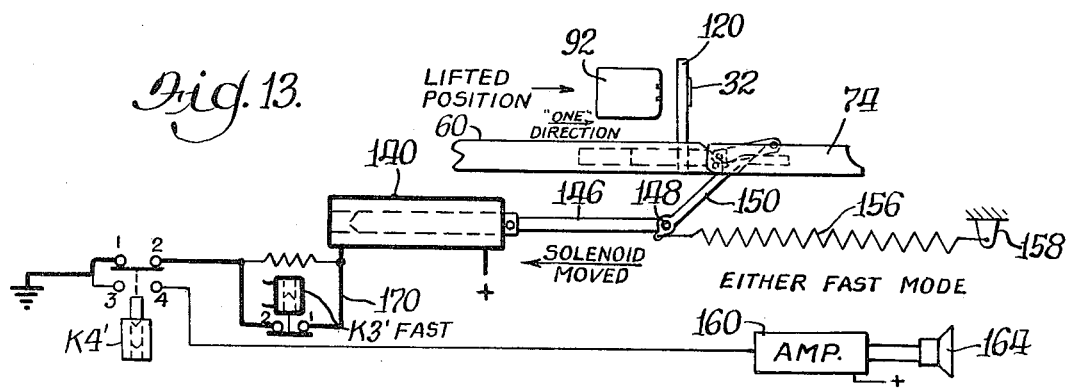
FIG. 13 is the circuit of FIG. 11 in either of the fast forward or fast rewind modes.

Refer now to the embodiment shown in FIGS. 11, 12 and 13. This is a somewhat more simplified version of the embodiment previously described, to more clearly illustrate the invention, although where possible the same components have been illustrated for consistency with the previous description.

Briefly, contacts 1, 2 of play relay K4' illustrate normally closed play switch means which is in series with the resistor 162 and the solenoid 140 between terminals of an electrical power source indicated by the ground and positive symbols. There is a bypass conductor 170, bypassing the resistor 162. The bypass conductor 170 has a normally open fast switch means including contacts 1, 2 of relay K3'. The latter is a single relay, combining the functions of contacts 10 and 11 of both relays K2 and K3 described in FIG. 8. Applicant wishes to emphasize that a single bypass conductor 170 as illustrated in FIGS. 11–13 may be utilized instead of the two separate bypass conductors shown in FIG. 8. Furthermore, instead of having the edit mode operable in both the fast forward and fast rewind conditions, it may be operable in either of those conditions. As a practical matter, it is generally satisfactory for the edit mode to be operable only in the fast forward direction, but it can be operable in either direction if desired.

FIG. 11 illustrates the simplified circuit in off mode. The solenoid 140 is partially energized through the resistor 162 to offset but not override the biasing spring 156, thereby enabling the tape lifter to be moved through a wide range of stable positions simply by manually manipulating the gate 74. FIG. 12 illustrates the play mode in which play relay K4' is energized. This deenergizes the solenoid 140 completely by opening contacts 1, 2 of K4' enabling the spring 156 to move the tape lifter bars to lowered position so the tape contacts the reproducing head directly. At the same time, contacts 3, 4 of K4' are closed, energizing the audio amplifier 160 and producing audio output through the speaker 164.

FIG. 13 illustrates either fast forward or fast rewind mode. The fast relay K3' is energized, thereby closing its contacts 1 and 2 establishing direct and full energization for the solenoid 140 through the bypass conductor 170 and the contacts 1, 2 of K4'. This causes the solenoid 140 to override the biasing spring 156 and lift the tape completely off the reproducing head 92 while completely opening the gate 74.

Refer now to the embodiment shown in FIGS. 14–17. This is the same embodiment as shown in FIGS. 11–13, with a minimal change to add the feature of an edit mode using the edit switch SW5 previously described in connection with FIG. 8. In FIG. 14, by contrast with FIG. 11, normally closed contacts 1, 2 of edit switch SW5 are in the previously described bypass conductor 170, in series with the normally open contacts 1, 2 of K3'. In addition, FIG. 14 shows the input side of audio amplifier 160 grounded through contacts 3, 4 of edit switch SW5 when the latter is depressed. FIG. 14 shows the circuit in off mode with exactly the same condition as FIG. 11, namely that solenoid 140 is partially energized through resistor 162.

FIG. 15 is the play mode similar to FIG. 12.

FIG. 16 is either fast mode similar to FIG. 13.

FIG. 17 is either edit mode resulting from depressing the edit switch SW5 when the circuit is in either fast mode as shown in FIG. 16. The bypass conductor 170 is opened at contacts 1, 2 of SW5, thereby partially energizing solenoid 140 through the resistor 162. At the same time, closing contacts 3, 4 of SW5 energizes the audio amplifier 160 enabling audio output through the speaker 164. During either edit mode of FIG. 17, the gate 74 may be manually manipulated to change the spacing of the tape relative to the reproducing head 92 to vary the volume of the audio output through the speaker.

A basic feature characterizing that part of the present invention embodied in the electrical control circuit is shown by way of summary and emphasis in FIG. 18 where a normally closed play switch and resistor 162 are connected in series with the solenoid 140, and a normally open fast switch is connected in the bypass conductor 170 paralleling the resistor. And, optionally, a normally closed edit switch (in broken lines) is provided in the bypass conductor in series with the fast switch.

While one basic form of the present invention has been shown and described, together with optional schematic diagrams with and without edit mode capabilities, it will be understood that various modifications and variations thereof may be effected without departing from the spirit and scope of the invention as defined by the appended claims.

The embodiments of the invention in which an exclusive property or privilege is claimed are defined as follows:

1. In reproducing apparatus, means selective to place said apparatus in play and fast modes in which tape is driven at play and fast speeds respectively past transducer head means;

tape lifter means movable to and from a lifted position disengaging the tape from the head means;

tape lifter moving means including biasing means and electrically energizable solenoid means connected to move said tape lifter means in opposite directions;

means automatically operable in response to placing said apparatus in play mode for changing the electrical energization state of said solenoid means to move said tape lifter means to a lowered position;

means automatically operable in response to placing said apparatus in fast mode for further changing the electrical energization state of said solenoid means to move said tape lifter means to said lifted position; and means selective to place said apparatus in edit mode; the improvement comprising:

a resistor; and means automatically operable in response to placing said apparatus in said edit mode for energizing said solenoid means through said resistor and balancing said solenoid means with said biasing means to enable said lifter means to be adjusted manually through a range of stable positions between said lowered and lifted positions.

2. In reproducing apparatus, means selective to place said apparatus in play and fast modes in which tape is driven at play and fast speeds respectively past transducer head means, and tape lifter means;

first automatic means operable in response to placing said apparatus in play mode for moving said lifter means to a lowered position out of engagement with said tape to enable said tape to engage said head means;

second automatic means operable in response to placing said apparatus in fast mode for moving said lifter means to a lifted position into engagement with said tape to disengage said tape from said head means; and means selective to place said apparatus in edit mode; the improvement comprising:

means automatically operable in response to placing said apparatus in said edit mode for balancing both of said first and second automatic means against one another to enable said lifter means to be adjusted manually through a range of stable positions between said lowered and lifted positions.

3. In reproducing apparatus, the combination of claim 2 in which said transducer head means and tape lifter means are housed in a compartment having a hinged cover gate, and means connecting said tape lifter means with said cover gate enabling movement of said tape lifter means by manually manipulating said cover gate in said edit mode.

4. In reproducing apparatus, the combination of claim 2 in which said tape lifter means comprises a rectilinearly movable support member and at least one tape lifter bar carried thereby and movable through a range of positions parallel to said tape.

5. In reproducing apparatus, tape drive means, play and fast mode circuits selectively activatable to place said apparatus in play and fast modes in which said tape drive means is actuated to drive magnetic tape at play and fast speeds, respectively, past transducer head means, and audio output means for converting signals transmitted between said tape and head means to audio output signals; the improvement comprising:

tape lifter means movable in opposite directions between a lifted position in which it lifts said tape out of engagement with said head means, and a lowered position in which the tape is disengaged from the tape lifter means and engages the head means;

biasing means urging said lifter means in one of said opposite directions;

solenoid means effective when activated to move said tape lifter means in the other of said opposite directions against the urgence of said biasing means;

control means including:

a. means automatically operable in response to activation of said play mode circuit to activate said audio output means and to deactivate said solenoid means sufficiently to enable said biasing means to move said tape lifter means to said lowered position; and b. means automatically operable in response to activation of said fast mode circuit to activate said solenoid means sufficiently to overcome said biasing means and move said tape lifter means to said lowered position.

6. In reproducing apparatus, the combination of claim 5 in which said control means includes edit means selectively operable to place the apparatus in edit mode, when said apparatus is in fast mode, to simultaneously activate said audio output means and said solenoid means to a degree which substantially balances said biasing means through an edit range of movement of said tape lifter means, said edit range of movement being intermediate said lifted and lowered positions;

whereby, within said edit range of movement, the proximity of said tape to said head means is adjustable to vary the amplitude of the audio output signals by manual adjustment of the tape lifter means to scan signals recorded on said tape at fast speed.

7. In reproducing apparatus, tape drive means, play and fast mode circuits selectively activatable to place said apparatus in play and fast modes in which said tape drive means is actuated to drive magnetic tape at play and fast speeds, respectively, past transducer head means, and audio output means for converting signals transmitted between said tape and head means to audio output signals; the improvement comprising:

tape lifter means movable in one direction to a lifted position in which it lifts said tape out of engagement with said head means, and movable in the opposite direction to a lowered position in which the tape is disengaged from the tape lifter means and engages the head means;

spring biasing means urging said lifter means in said opposite direction;

solenoid means effective when activated to move said tape lifter means in said one direction against the urgence of said spring biasing means;

a control circuit including:

a normally-closed play switch and a resistor connected in series with said solenoid means between terminals of an electrical power source, and at least one normally-open fast switch in a bypass conductor paralleling said resistor;

means responsive to activation of said play mode circuit to activate said audio output means and to open said play switch thereby deenergizing said solenoid means enabling said biasing means to move said tape lifter means to its said lowered position and enabling said tape to engage said head means and play the signal on the tape; and means responsive to activation of said fast mode circuit to close said fast switch thereby fully energizing said solenoid means through a path including said play and fast switches and bypassing said resistor to move said tape lifter means to its said lifted position and disengage said tape from said head means for fast tape movement past said head means.

8. In reproducing apparatus, the combination of claim 7 including a normally-closed edit switch in series with said fast switch in said bypass conductor thereby limiting energization of said solenoid means to current passing through said resistor when the edit switch is opened.

9. In reproducing apparatus, the combination of claim 8 in which said resistor is sized to substantially balance the pull of the solenoid means with the pull of the spring biasing means on the tape lifter means to enable the latter to be moved manually through a range of stable positions to vary the proximity of said tape to said head means when the edit switch is opened.

10. In reproducing apparatus, tape drive means; play, fast forward and fast rewind mode circuits selectively activatable to place said apparatus, respectively, in play, fast forward and fast rewind modes; said tape drive means being effective in play mode to drive magnetic tape at play speed in forward direction past transducer head means, and being effective in fast forward and fast rewind modes to drive said magnetic tape at fast speeds, respectively, in forward and rewind directions past said transducer head means; and audio output means for converting signals transmitted between said tape and head means to audio output signals; the improvement comprising:

tape lifter means movable in one direction to a raised position in which it lifts said tape out of engagement with said head means, and movable in the opposite direction to a lowered position in which the tape is disengaged from the tape lifter means and engages the head means;

spring biasing means urging said lifter means in said opposite direction;

solenoid means effective when activated to move said tape lifter means in said one direction against the urgence of said spring biasing means;

a control circuit including:
  a. normally-closed play switch means and a resistor connected in series with said solenoid means between terminals of an electrical power source, and normally-open fast switch means connected in bypass conductor means paralleling said resistor;
  b. means operable with activation of said play mode circuit for simultaneously activating said audio output means and opening said play switch means to deactivate said solenoid means enabling said spring biasing means to move said tape lifter means to its said lowered position and enabling said tape to engage said head means, to play said tape;
  c. means operable with activation of either of said fast mode circuits to close said fast switch means to fully and directly activate said solenoid means through a path including said play and fast switch means and bypassing said resistor to move said tape lifter means to its said raised position and disengage said tape from said head means, for moving the tape selectively at fast speed in either direction while it is held out of engagement with the head means by the tape lifter means.

11. In reproducing apparatus, the combination of claim 10 including normally-closed edit switch means in series with said first switch means in said bypass conductor means; and means operable with opening of said edit switch to activate said audio output means;

whereby upon operation of said edit switch means, said solenoid means is partially energized through said resistor sufficiently to oppose and offset the spring biasing means without moving said tape lifter means, thereby enabling said tape lifter means to be moved manually through a range of stable edit positions intermediate its raised and lowered positions to adjust the proximity of the tape to the head means and the output amplitude of the audio output signals, to scan the tape at fast speed.

* * * * *

UNITED STATES PATENT OFFICE
CERTIFICATE OF CORRECTION

PATENT NO. : 3,942,189
DATED : March 2, 1976
INVENTOR(S) : John P. Jenkins

It is certified that error appears in the above-identified patent and that said Letters Patent are hereby corrected as shown below:

Title page [57] Abstract: line 1, "lifer" should be --lifter--.

Col. 12, line 24, "first" should be --fast--.

Signed and Sealed this eighteenth Day of May 1976

[SEAL]

Attest:

RUTH C. MASON
Attesting Officer

C. MARSHALL DANN
Commissioner of Patents and Trademarks